Patented May 26, 1931

1,807,503

UNITED STATES PATENT OFFICE

HERMAN ALEXANDER BRUSON, OF GERMANTOWN, PENNSYLVANIA, ASSIGNOR TO ROHM & HAAS CO., INC., OF PHILADELPHIA, PENNSYLVANIA

CONDENSATION PRODUCT OF KETONIC ACIDS

No Drawing.   Application filed May 27, 1930. Serial No. 456,290.

This invention relates to esters of acids derived from naturally occurring, fatty-oil glycerides. More especially it describes new mixed glyceryl esters of these acids and certain ketonic acids of the general formula

HOOC—R—CO—R'—COOH wherein R and R' are each aromatic nuclei; an example of this class being benzophenone-dicarboxylic acid,

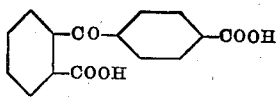

One object of the present invention is to prepare new, extremely tough and water-resistant compounds which are suitable for use in coating compositions, nitro-cellulose lacquers, and varnishes. Another object of this invention is to convert the fluid acid components of natural fatty glycerides into tough, plastic, benzol-soluble resins that possess low solvent retention qualities, and which in the form of coatings, dry hard rapidly to extremely adherent films.

It has heretofore been known that certain polybasic acids may be condensed or esterified with glycerol or other polyhydric alcohols, and fatty acids derived from natural fatty oil glycerides, to yield resinous masses. The acids which have been used for this purpose in the past are phthalic, succinic, maleic, citric, tartaric, malic, and the like. Howell, U. S. Pat. 1,098,728 (1914); Dawson, U. S. Pat. 1,141,944 (1915); Arsem, U. S. Pat. 1,098,777 (1914); Burke & Hopkins, U. S. Pat. 1,667,189 (1928); Weber, U. S. Pat. 1,690,515 (1928). It has been recognized however, that such products possess mediocre waterproofness.

Apparently the cause of the poor waterproofness is due to the nature of the polybasic acids heretofore employed for the condensation. Such acids for example as phthalic, succinic, maleic, citric, and tartaric acids are themselves appreciably water soluble as compared to the benzophenone-dicarboxylic acids which we propose to use. Furthermore, the glycerides of the polybasic acids heretofore employed, are not very stable towards heat or moisture as compared with the glycerides of the benzophenone-dicarboxylic acids. When condensed in open kettles with fatty oil acids and polyhydric alcohols, the polybasic acids or their anhydrides heretofore used, readily sublime out at the high temperatures required for the condensation, thereby leaving an excess of unreacted or partially esterified alcohols in the final resin, thus cutting down its waterproofness. If attempts are made to correct this loss from sublimation by adding an excess of polybasic acid, the final resin obtained is acidic and is not waterproof due to the water solubility of the acid used.

Marked improvements result if the polybasic acid used is itself water resistant, stable, and relatively non-sublimable at the temperatures required for the condensation; and more uniform resins having greater waterproofness are obtained by the use of such acids.

In accordance with the following invention, after considerable experimentation with many different types of acids, it has now been found that polybasic acids containing a plurality of aromatic groups and a keto group, meet all of the above requirements and yield resins of superior properties. It has been found that ketonic acids of the general formula

HOOC—R—CO—R'—COOH wherein R and R' are aromatic nuclei, are especially effective for this purpose, and in particular the acid known as benzophenone-2,4'-dicarboxylic acid

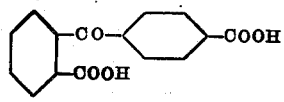

such as is obtained by the oxidation of para-toluyl-ortho-benzoic acid by means of an alkaline permanganate solution.

As illustrating my invention the following examples are given:

Example 1

The following mixture is placed in a suitable kettle equipped with an agitator and heated as rapidly as possible to 240–250° C.

135 gr. benzophenone-2,4'-dicarboxylic acid (melting point 235° C.)
46 gr. glycerol
149 gr. fatty acids obtained from hydrolysis of raw linseed oil.

The mixture is heated for about 4 hours at 240–250° centigrade preferably in an inert atmosphere such as nitrogen or carbon dioxide to prevent oxidation. A reddish mass is obtained forming a very tough, plastic resin readily soluble in toluene, butyl acetate and acetone.

Example 2

135 gr. benzophenone-2,4'-dicarboxylic acid
46 gr. glycerol
120 gr. fatty acids obtained from hydrolysis of raw linseed oil
50 gr. raw linseed oil are heated together at 240–250° C. for 3½ to 4 hours. Product is tougher than that obtained in Example 1. It is soluble in butyl acetate, toluene, and acetone.

Example 3

135 gr. benzophenone-2,4'-dicarboxylic acid
46 gr. glycerol
100 gr. ricinoleic acid (from hydrolysis of castor oil)
40 gr. castor oil are heated together about 6 hours at 240° C. A tough resin is obtained, soluble in butyl acetate and acetone.

Example 4

135 gr. benzophenone-2,4'-dicarboxylic acid
46 gr. glycerol
150 gr. ricinoleic acid (from hydrolysis of castor oil)

are heated together about 5 hours at 245° C. Product is a tough resin soluble in butyl acetate.

Example 5

135 gr. benzophenone-4,4'-dicarboxylic acid
32 gr. ethylene glycol
100 gr. fatty acids from hydrolysis of olive oil (oleic acid)

were heated together for 2½ hours at 200–225° C. Formed a plastic mass.

Example 6

135 gr. benzophenone-4,4'-dicarboxylic acid
53 gr. diethylene glycol
150 gr. fatty acids from hydrolysis of tung oil, were heated together for 2–3 hours at 225° C. until a homogeneous plastic mass was obtained.

In place of the fatty acids and fatty oils given in the above examples; equivalent quantities of other fatty acids derived from natural fatty glycerides may be used. These include stearic, palmitic and elæostearic acids as well as oils such as fish oils, soya bean oil, perilla oil, tallow or mixtures thereof.

In place of glycerol; ethylene glycol, diethylene glycol, mannitol, trimethylene glycol or other polyhydric alcohol may be used in equivalent quantity.

Other isomeric benzophenone-dicarboxylic acids or mixtures thereof may be used in lieu of benzophenone-2,4'-dicarboxylic acid as above in like proportions. These include benzophenone-4,4'-dicarboxylic acid, benzophenone-3,4'-dicarboxylic, benzophenone-2,2'-dicarboxylic acid and the numerous benzophenone-dicarboxylic acids in which both carboxyl groups are on the same aromatic nucleus. For practical purposes, however, benzophenone-2,4'-dicarboxylic acid gives satisfactory results. Alkylated or halogenated benzophenone-dicarboxylic acids are understood to be included herein as equivalents.

Resins produced by the above process possess high durability, water-proofness and compatibility with solutions of nitro-cellulose. They may be used as ingredients in coating compositions for wood and metal: in nitrocellulose lacquers, as adhesives, as primers and surfacers for automobile bodies and the like.

Although I have given specific examples of methods for preparing the above mentioned resins, it is apparent that numerous and wide modifications may be made in the process without departing from its scope. For example, temperatures higher or lower than those indicated may be used and mixtures of two or more polyhydric alcohols, or two or more fatty acids may be employed in the condensation. The presence of fatty glycerides such as castor oil, and linseed oil, during the condensation affords a homogeneous mixture of the final resin in the oil. It is also understood that catalysts such as lime or magnesia may be added during the condensation to hasten the process, and furthermore that the condensation may be carried out in two or more stages; that is, the polyhydric alcohol and the benzophenone-dicarboxylic acid may be condensed first and the fatty acid, or fatty glyceride, or both, added subsequently.

What I claim is:

1. The process of preparing a mixed ester which consists in heating to reaction temperature a mixture of an acid derived from a natural fatty glyceride, a polyhydric alcohol, and a benzophenone-dicarboxylic acid.

2. The process of preparing a mixed ester which consists in heating to reaction temperature a mixture of an acid derived from a natural fatty glyceride, a polyhydric alcohol, and benzophenone-2,4'-dicarboxylic acid.

3. The process of preparing a mixed ester which consists in heating to reaction temperature a mixture of an acid derived from a natural, fatty glyceride, glycerol, and a benzophenone-dicarboxylic acid.

4. The process of preparing a mixed ester which consists in heating to reaction temperature a mixture of an acid derived from a natural, fatty glyceride, glycerol, and benzophenone-2,4'-dicarboxylic acid.

5. The process of preparing a mixed ester which consists in heating to reaction temperature a mixture of drying oil fatty acids, glycerol, and benzophenone-2,4'-dicarboxylic acid.

6. The process of preparing a mixed ester which consists in heating to reaction temperature a mixture of linseed oil fatty acids, glycerol, and benzophenone-2,4'-dicarboxylic acid.

7. A composition of matter comprising a reaction product of the fatty acids derived from natural, fatty glycerides, a polyhydric alcohol and a benzophenone-dicarboxylic acid.

8. A composition of matter comprising a reaction product of the fatty acids derived from natural, fatty glycerides, a polyhydric alcohol, and benzophenone-2,4-dicarboxylic acid.

9. A composition of matter comprising a reaction product of the fatty acids derived from natural, fatty glycerides, glycerol, and a benzophenone-dicarboxylic acid.

10. A composition of matter comprising a reaction product of the fatty acids derived from natural, fatty glycerides, glycerol, and benzophenone-2,4'-dicarboxylic acid.

11. A composition of matter comprising a reaction product of a drying oil fatty acid, glycerol, and benzophenone-2,4'-dicarboxylic acid.

12. A composition of matter comprising a reaction product of linseed oil fatty acids, glycerol, and benzophenone-2,4'-dicarboxylic acid.

13. The process of preparing a mixed ester which comprises heating to reaction temperature a mixture of acids derived from a natural fatty glyceride, a polyhydric alcohol, and a ketonic acid of the general formula $$HOOC-R-CO-R'-COOH$$

where R and R' are benzene nuclei.

14. The process of preparing a mixed ester which comprises heating to reaction temperature a mixture of acids derived from a natural fatty glyceride, glycerol and a ketonic acid of the general formula $$HOOC-R-CO-R'-COOH$$

where R and R' are benzene nuclei.

15. A composition of matter comprising a reaction product of acids derived from natural, fatty glycerides, a polyhydric alcohol and a ketonic acid of the general formula $$HOOC-R-CO-R'-COOH$$

wherein R and R' are benzene nuclei.

16. A composition of matter comprising a reaction product of the fatty acids derived from natural, fatty glycerides, glycerol and a ketonic acid of the general formula $$HOOC-R-CO-R'-COOH$$

wherein R and R' are benzene nuclei.

17. A composition of matter comprising a reaction product of drying oil fatty acids, a polyhydric alcohol, and an acid of the general formula $$HOOC-R-CO-R'-COOH$$

wherein R and R' are benzene nuclei.

18. A composition of matter comprising a reaction product of a polyhydric alcohol, an acid of the general formula $$HOOC-R-CO-R'-COOH$$

wherein R and R' are benzene nuclei and an acid of the class consisting of linseed oil fatty acids, and tung oil fatty acids.

19. A composition of matter comprising a reaction product of glycerol, benzophenone-4,4'-dicarboxylic acid, and a member of the class consisting of linseed oil fatty acids, tung oil fatty acids and mixtures thereof.

20. A composition of matter comprising a reaction product of a drying oil, a benzophenone-dicarboxylic acid, a polyhydric alcohol, and drying oil fatty acids.

HERMAN ALEXANDER BRUSON.